US010778265B2

(12) United States Patent
Coe et al.

(10) Patent No.: US 10,778,265 B2
(45) Date of Patent: Sep. 15, 2020

(54) CELL SITE PASSIVE INTERMODULATION DETECTION RECEIVER

(71) Applicant: Telefonaktiebolaget LM Ericsson (publ), Stockholm (SE)

(72) Inventors: Peter Coe, Ottawa (CA); Mark William Wyville, Ottawa (CA); Pierre-Andre Laporte, Gatineau (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/769,356

(22) PCT Filed: Oct. 26, 2015

(86) PCT No.: PCT/IB2015/058249
§ 371 (c)(1),
(2) Date: Apr. 19, 2018

(87) PCT Pub. No.: WO2017/072552
PCT Pub. Date: May 4, 2017

(65) Prior Publication Data
US 2018/0248576 A1    Aug. 30, 2018

(51) Int. Cl.
*H04B 1/10* (2006.01)
*H04W 88/08* (2009.01)
(Continued)

(52) U.S. Cl.
CPC ......... *H04B 1/1027* (2013.01); *H04B 17/309* (2015.01); *H04W 88/08* (2013.01); *H04B 2001/1072* (2013.01); *H04W 24/08* (2013.01)

(58) Field of Classification Search
CPC .... H04W 24/08; H04W 88/08; H04B 1/1027; H04B 1/10; H04B 1/525; H04B 17/345
(Continued)

(56) References Cited

U.S. PATENT DOCUMENTS

2013/0016024 A1* 1/2013 Shi .................. H01Q 1/243
343/833
2013/0310023 A1* 11/2013 Bevan .............. H04B 1/1027
455/423
(Continued)

FOREIGN PATENT DOCUMENTS

WO    03/030416 A1    4/2003
WO    2014/012585 A1    1/2014
(Continued)

OTHER PUBLICATIONS

International Search Report and Written Opinion of the International Searching Authority dated Jul. 7, 2016 issued in corresponding PCT Application Serial No. PCT/IB2015/058249, consisting of 10 pages.

*Primary Examiner* — Leila Malek
(74) *Attorney, Agent, or Firm* — Sage Patent Group

(57) ABSTRACT

A method and system for detecting PIM signals in a wireless communication base station are disclosed. According to one aspect, a method includes receiving radio frequency, RF, signals over a frequency band spanning a plurality of frequencies of signals transmitted by at least a first transmitter external to the base station and at least a second transmitter. The method includes determining frequencies at which signals are present among the received radio frequency signals. PIM signal frequencies are calculated based on the determined frequencies at which signals are present. The method includes determining whether the calculated PIM signal frequencies interfere with selected uplink channels.

22 Claims, 6 Drawing Sheets

(51) Int. Cl.
*H04B 17/309* (2015.01)
*H04W 24/08* (2009.01)

(58) Field of Classification Search
USPC .......................................................... 375/346
See application file for complete search history.

(56) References Cited

U.S. PATENT DOCUMENTS

| | | | | |
|---|---|---|---|---|
| 2013/0322395 | A1* | 12/2013 | Kazmi | H04W 72/082 |
| | | | | 370/329 |
| 2015/0087242 | A1 | 3/2015 | Bain et al. | |
| 2016/0157115 | A1* | 6/2016 | Kim | H04W 24/08 |
| | | | | 455/423 |
| 2016/0352369 | A1* | 12/2016 | Smith | H04B 1/1036 |

FOREIGN PATENT DOCUMENTS

| | | |
|---|---|---|
| WO | 2014/083361 A1 | 6/2014 |
| WO | 2014/085345 A1 | 6/2014 |

* cited by examiner

CELL SITE PASSIVE INTERMODULATION DETECTION RECEIVER

CROSS-REFERENCE TO RELATED APPLICATIONS

This application is a Submission Under 35 U.S.C. § 371 for U.S. National Stage Patent Application of International Application Number: PCT/IB2015/058249, filed Oct. 26, 2015 entitled "CELL SITE PASSIVE INTERMODULATION DETECTION RECEIVER" which is incorporated in the entirety herein by reference.

TECHNICAL FIELD

Wireless communications and in particular to a method and system for passive intermodulation (PIM) detection at a base station of a wireless communication system.

BACKGROUND

The passive intermodulation (PIM) interferences that are observed at wireless communication sites are usually generated from two or more high power carriers which are mixed together in a non-linear passive component, such as rusty metal, located in the vicinity of the transmit antennas of the radios at the site. Those intermodulation products are especially harmful when they are present in one of the uplink receive channels of the radios since the undesired intermodulation products deteriorate the signal to interference plus noise ratio (SINR) as well as the link budget.

FIG. 1 is a block diagram of a conventional wireless communication system 10 having radios 12a and 12b, referred to herein collectively as radios 12. Each radio 12 may serve, via antennas 13a and 13b, multiple wireless devices 14a and 14b, referred to herein collectively as wireless devices 14, which may include but are not limited to mobile phones, laptop computers, tablet computers, other wireless devices, etc. Each radio 12 may be in the same base station 15, such as an eNodeB in a long term evolution (LTE) wireless communication system or may be in different base stations. Each base station 15 or radio 12 is in communication with a network 16 which may include the Internet and the Public Switched Telephone Network (PSTN). In a typical wireless communication system there are many base stations and many wireless devices 14. Each base station 15 may have multiple antennas 13 and multiple transmitters and receivers. Further, more than one base station 15 can be located at the same location, referred to herein as a cellular site.

The wireless communication system 10 may also include passive intermodulation (PIM) interferences 18. PIM interferences have always existed in the vicinity of high power transmitters. However, they are becoming a problem for cellular communications in crowded spectrums where the intermodulation products can be present in the selected uplink channel, thus desensitizing the collocated receivers. PIM is a form of intermodulation distortion that occurs in passive components such as antennas, cables, connectors or duplexers with two or more high power input signals. PIM can also be generated by rust, corrosion, loose connections, dirt, roofing materials and oxidation. When PIM is present, two or more signals can mix and generate interference signals. Self-generated PIM is caused by a base station's own signals interfering with one another. PIM may also arise when a base station's signals interfere with signals from external sources. Further, PIM may result due to interference of external signals only.

PIM interference may be generated by the interaction of strong radio frequency (RF) signals of one or more radios and PIM sources. The resulting PIM interferences will exist at a set of predictable frequencies that are dependent on the frequencies and bandwidths of the strong RF signals. The PIM signals may be in a conducting path of the RF signals, such as within the radio, connectors, cables and antenna, or may be external to the conducted path, i.e., outside the antenna and radio.

In some cases, strong RF signals on the downlink carriers supported by the radio that mix at the PIM source are known to an algorithm or module that is capable of performing PIM detection and/or cancellation. These RF signals can be obtained by, for example, sniffing the cable that connects to the RF front end of the radio to a digital baseband unit. The RF signals can also be obtained by tapping the signals somewhere along the radio's transmission path, such as by use of a directional coupler, and then sampling the obtained signal by a receiver. In some cases, the downlink carriers are not known and may be determined by over the air sampling. The downlink carrier frequencies may be used to determine frequencies at which PIM occurs.

However, known methods do not detect PIM products generated by non-linear mixing of two separate radio bands. Many radios have the ability to detect and measure if there is interference in a received signal, but cannot determine the type of interference or whether the interference is being generated by PIM products at the base station. If PIM is suspected, a visit to the base station site may be needed to perform further measurements to determine if PIM is present.

There are also standalone PIM test tools that generate two closely spaced continuous wave test tones within a radio band and detect the returned close-in third order modulation (IM-3) product. These instruments can be used at the base station site, but they do not measure mixing of products of transmit signals of two different radios, and are unlikely to detect PIM resulting from the mixing of RF signals from the different radios.

SUMMARY

The present disclosure advantageously provides a method and system for detecting PIM signals in a wireless communication base station. According to one aspect, a method includes receiving RF signals over a frequency band spanning a plurality of frequencies of signals transmitted by at least a first transmitter external to the base station and at least a second transmitter. The method includes determining frequencies at which signals are present among the received radio frequency signals. PIM signal frequencies are calculated based on the determined frequencies at which signals are present. The method includes determining whether the calculated PIM signal frequencies interfere with selected uplink channels.

According to this aspect, in some embodiments, the method further includes processing a sample of a signal at a calculated PIM frequency and a sample of the received radio signal and comparing an output of the processing to a threshold to determine whether a PIM signal is present. In some embodiments, the processing includes correlating the sample of the signal at the calculated PIM frequency with the sample of the received radio frequency. In some embodiments, the method further includes identifying frequencies of at least two RF signals contributing to PIM at a calculated PIM frequency. In some embodiments, the receiving over the frequency band is performed by a single wideband receiver. In some embodiments, the receiving includes receiving by a plurality of antennas having different polarizations.

In some embodiments, wherein the receiving includes receiving by at least one wide band antenna. In some embodiments, the method further includes periodically reporting results of PIM signal detection to a remote site. In some embodiments, the receiving further comprises scanning over a frequency range to search for PIM signals. In some embodiments, the received RF signals are adaptively weighted to isolate multiple RF signals having a same frequency.

According to another aspect, PIM signal detection system for detecting PIM signals at a wireless communication base station is provided. The PIM signal detection system includes at least one interfering signal receiver collectively having a frequency response configured to receive RF signals over a frequency band spanning a plurality frequencies of signals transmitted by at least a first transmitter external to the base station and at least a second transmitter. The PIM signal detection system includes a signal detector configured to determine frequencies at which signals are present among the received RF signals. A calculator is configured to calculate PIM signal frequencies based on the determined frequencies at which signals are present, and an interference determiner is configured to determine whether the calculated PIM signal frequencies interfere with selected uplink channels. In some embodiments, the calculator is further configured to calculate PIM frequencies by identifying frequencies of two or more received RF signals contributing to a PIM signal. In some embodiments, the at least one interfering signal receiver is a single wideband receiver. In some embodiments, the PIM signal detection system includes a plurality of antennas coupled to at least one interference signal receiver, each antenna having a different polarization.

According to this aspect, in some embodiments, the interference determiner further includes a sampler configured to sample the received RF signals at a calculated PIM frequency, a processor configured to process the sample of the received RF signal and a sample of a signal at a calculated PIM frequency, and a comparator configured to compare an output of the processing to a threshold to determine whether a PIM signal is present. In some embodiments, the processing includes correlating the sample of the signal at the calculated PIM frequency with the sample of the received radio frequency.

In some embodiments, the PIM signal detections system includes at least one wideband antenna to receive the RF signals. In some embodiments, the PIM signal detection system includes a communication interface configured to periodically report results of PIM signal detection to a remote site. In some embodiments, the PIM signal detection system includes a scanner configured to scan over a frequency range to search for PIM signals. In some embodiments, the second transmitter has a transmitter observation receiver (TOR) and the at least one interfering signal receiver utilizes the TOR of the second transmitter to sample a downlink signal of the transmitter. Some embodiments include a duplexer and the at least one interfering signal receiver shares the duplexer with the second transmitter.

According to yet another aspect, a PIM signal detection system for detecting PIM signals at a wireless communication base station is provided. The PIM signal detection system includes at least one receiver module collectively having a frequency response capable of receiving a plurality of RF signals transmitted by transmitters of the base station. A signal detector module is configured to determine frequencies at which signals are present among the received RF signals. A calculator module is configured to calculate PIM signal frequencies based on the determined frequencies at which signals are present. A sampling module is configured to sample the received RF signals at the calculated PIM signal frequencies to determine a presence of a PIM signal at each PIM signal frequency. An interference determiner module is configured to determine whether the calculated PIM signal frequencies interfere with selected uplink channels.

According to this aspect, the interference determiner is further configured to process a sample of a signal at a calculate PIM frequency and a sample of the received radio frequency signals, and wherein the PIM signal detection system further includes a comparator module configured to compare a result of the processing to a threshold to detect whether a PIM signal is present. In some embodiments, the processing includes correlating the sample of the signal at the calculated PIM frequency with the sample of the received radio frequency. In some embodiments, the PIM signal detection system further includes a communication interface module configured to periodically report results of the passive intermodulation, PIM, detection to a site remote from the cell site. In some embodiments, the PIM signal detection system further includes a scanner module configured to scan over a frequency range to search for downlink signals.

BRIEF DESCRIPTION OF THE DRAWINGS

A more complete understanding of the present embodiments and the attendant advantages and features thereof, will be more readily understood by reference to the following detailed description when considered in conjunction with the accompanying drawings wherein.

DETAILED DESCRIPTION

Figure 1:
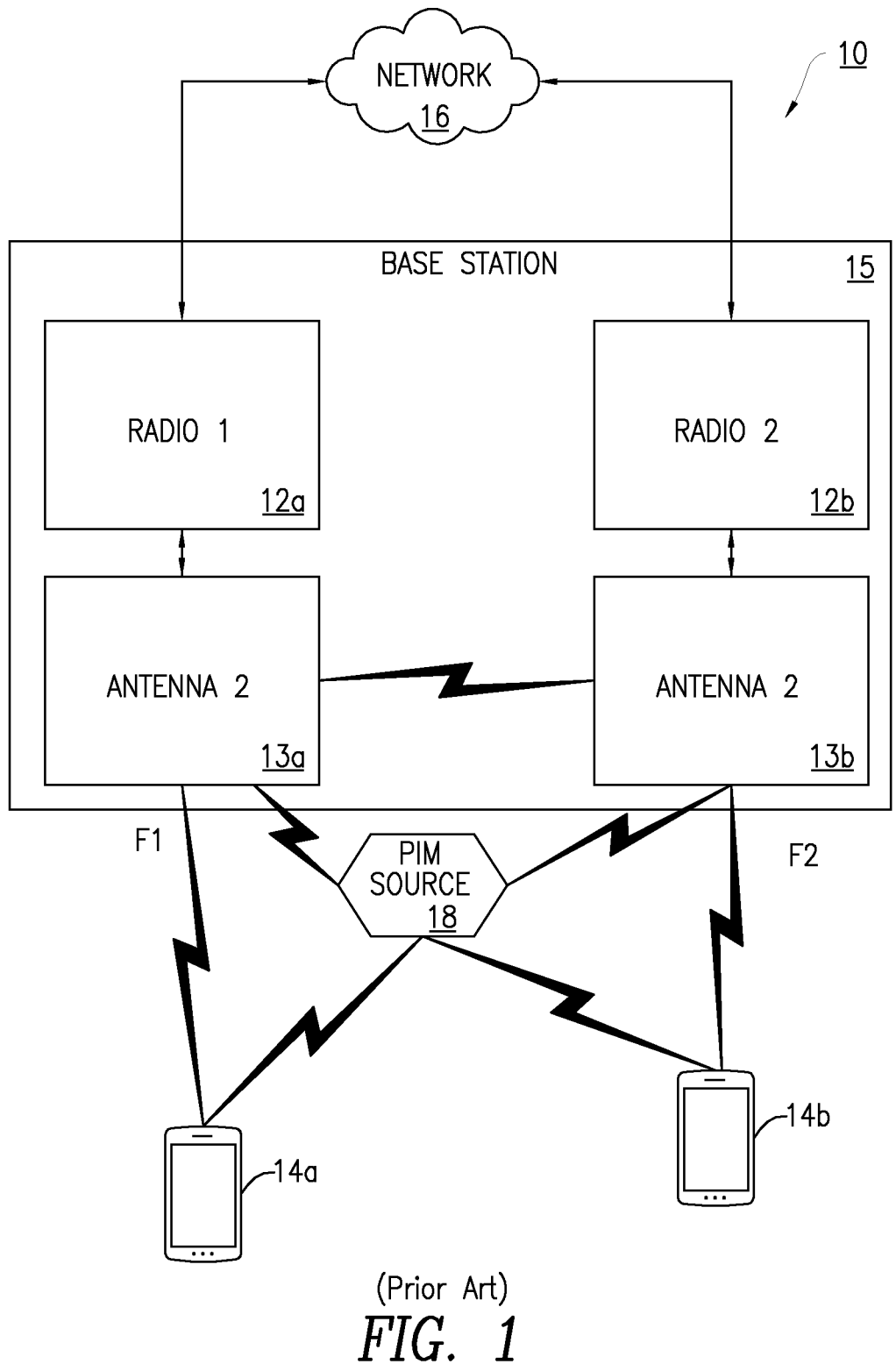
FIG. 1 is a block diagram of a known wireless communication system having a PIM source.

Before describing in detail exemplary embodiments, it is noted that the embodiments reside primarily in combinations of apparatus components and processing steps related to a method and system for passive intermodulation (PIM) detection at a base station of a wireless communication. Accordingly, the system and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Although terminology from Third Generation Partnership Project (3GPP) Long Term Evolution (LTE) communication systems is used in this disclosure to describe some embodiments, this should not be seen as limiting the scope of the embodiments to only the aforementioned system. Other wireless systems, including not only wideband code division multiple access (WCDMA), WiMax, ultra mobile broadband (UMB) and global system for mobile communications (GSM), but also, other current or future 4G or 5G networks and beyond, may also benefit from exploiting the subject matter covered within this disclosure.

Some embodiments described herein detect PIM products generated by non-linear mixing of two separate radio bands. Some embodiments utilize a receiver at the base station to sample at least one downlink (DL) signal that is not otherwise known to the base station. The sampled at least one downlink signal is input to a PIM detection and/or cancellation algorithm or module along with known DL signals, if any. Thus, in some embodiments, the base station is configured to detect PIM and/or cancel PIM when the PIM interference is generated at least in part by DL signals that the base station might not have otherwise known, such as when common public radio interface (CPRI) or the conducted RF path are not accessible.

Base station uplink receivers are not normally tuned to receive a downlink carrier. Thus, in some embodiments, at least one additional receiver is employed at the base station to sample the unknown downlink signals. The DL signals need not be detected with high resolution, so it is possible to use receivers with lower dynamic range than the dynamic range of the uplink receiver(s) of the base stations. The DL signals might be needed over several frequency bands. Since the dynamic range of the at least one additional receiver for sampling the unknown DL signals is low, implementing a receiver to sample the DL signals over several bands is feasible without a need for RF front end filtering. In some embodiments, in addition to providing an additional receiver, the existing transmitter observation receiver (TOR) of a radio may be employed, with some modifications, to sample downlink signals.

The unknown DL signals could have multiple polarizations being transmitted. PIM detection and/or cancellation can improve if these multiple polarized signals are separated. This separation may be achieved by employing more than one additional receiver or one or more receivers in addition to the TOR, and employing additional antennas where each antenna has a different orientation to capture different polarized signals. Since the signals are unknown, they may be weighted by combining weights that are adapted via feedback possibly from a PIM detection module and/or a cancellation algorithm or module.

In some embodiments, a broadband receiver for detecting downlink signals is implemented at the base station. The receiver for detecting DL signals may scan across the entire spectrum of a radio access technology to find significant energy generated on the downlink from the transmitters at the base station. The frequencies at which significant energy is generated may be used to calculate frequencies where PIM may occur. For example if a first radio transmits at frequency F1 and a second radio transmits at frequency F2, the third order intermodulation products may be found at the frequencies 2*F1−F2 and 2*F2−F1. Higher intermodulation products may also be determined. The signal at the PIM frequencies may be measured to determine if significant energy is at the PIM frequencies.

To successfully detect the unknown downlink signals and PIM signals, a broadband antenna may be used so that the receiver used for PIM detection can scan over a very wider frequency range. Further, sampling of the signal received by the antenna may be performed before filtering of the signal received by the antenna.

Note that the measurements can be run periodically to allow remote monitoring of PIM products that can be correlated against any degraded signal statistics of the uplink receiver collected at the base station. Due to periodic measurement, the effect of any changes in the base station, such as addition or subtraction of radios, antennas and material, may be detected. Having a broadband PIM detection module may be independent of the radio access technology (RAT), so that any type or combination of radio transmitters can be monitored for possible PIM generation. Note also that the receiver for monitoring the DL signals and for detecting signals at the computed PIM frequencies, measures energy only. Modulation and down conversion are not required, so the complexity and cost of the monitoring receiver may be low.

Figure 2:
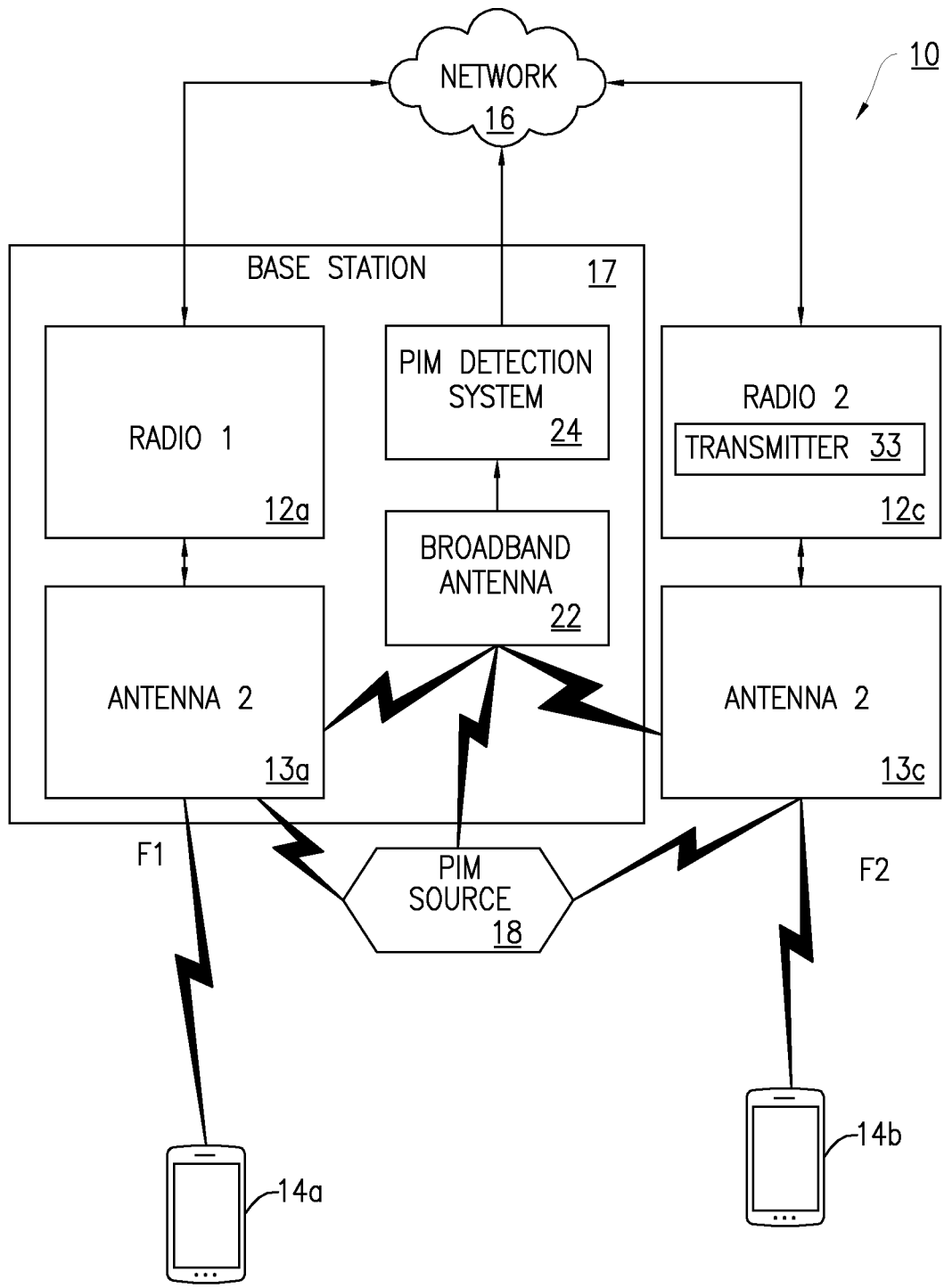
FIG. 2 is a block diagram of a wireless communication system having PIM detection capabilities according to principles discussed herein.

FIG. 2 is a block diagram of an exemplary wireless communication system 20 constructed in accordance with principles of the disclosure. System 20 includes a base station 17 having a radio 12a and antenna 13a. System 20 further includes wireless devices 14, a network 16 and at least one PIM source 18. The base station 17 also includes a broadband antenna 22 and a PIM detection system 24. The PIM detection system 24 receives—via broadband antenna(s) 22—signals from internal radio 12a radio via antennas 13, from a transmitter 33 of an external radio 12c and from the PIM source 18. Note that the radios 12 may be at the same cell site along with the PIM source 18. Radio 1, 12a of radios 12, transmits on the downlink at least at a first DL frequency F1 and radio 2, 12c of radios 12, transmits on the downlink at least at a second DL frequency F2. These downlink signals interact with the PIM source 18, which generates PIM signals that are received by the broadband antenna 23 along with F1 and F2. Note, that although only two downlink frequencies F1 and F2 are discussed here by way of example, more or less than two downlink signals may be detected and may contribute to PIM. Note also that one or some of the downlink signal frequencies may be known beforehand, while one or more downlink frequencies may not be known beforehand The PIM detection system 24 may scan a wideband of frequencies to detect the DL signal frequencies F1 and F2. Based on these frequencies, the PIM detection system 24 may compute PIM frequencies at which PIM signals may exist. For example, $3^{rd}$ order intermodulation may occur at frequencies 2F1−F2 and 2F2−F1. The disclosure is not limited to $3^{rd}$ order intermodulation PIM products. Other order intermodulation PIM products can also be present and detected, for example, $5^{th}$ order intermodulation PIM products. The PIM detection system 24 may process a sample of a signal at a calculated PIM frequency and a sample of the received radio frequency, compare an output from the processing to a threshold to determine whether a PIM signal is present. In some embodiments, the processing includes correlating the sample of the signal at the calculated PIM frequency with the sample of the received radio frequency.

The results of the determination that PIM exists at PIM frequencies may be conveyed to a remote location via the network 16.

Once the PIM detection system 24 detects the presence of PIM at PIM frequencies, at least one of the radios 12 may determine if the PIM frequencies at which PIM is detected is at or near an uplink signal frequency channel. If so, then steps may be taken to reduce the PIM. Thus, embodiments include a method and apparatus for detecting PIM originating from a PIM source at which occurs the mixing of downlink frequencies of different radio bands.

Figure 3:
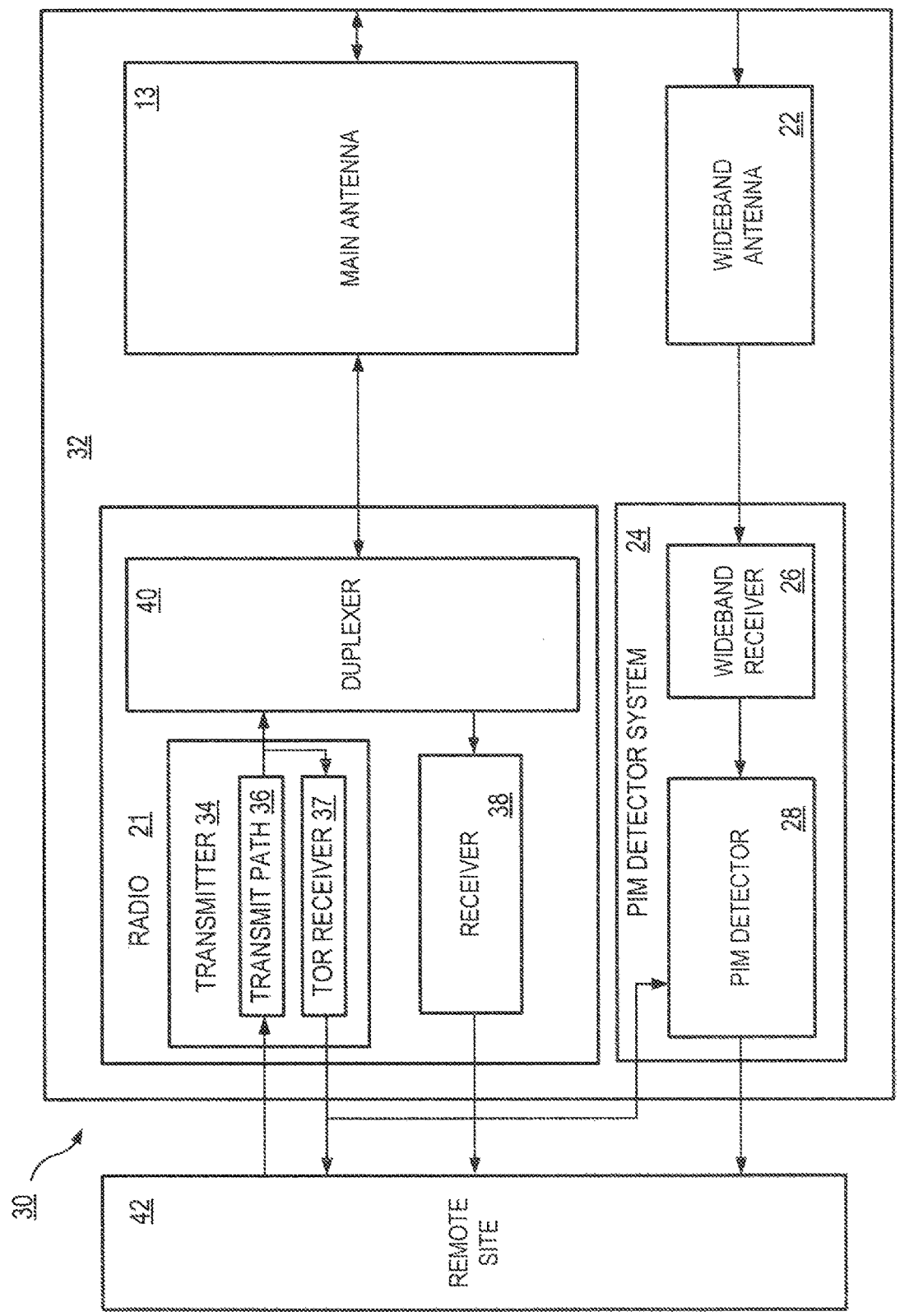
FIG. 3 is a block diagram of a wireless communication system having a radio and a PIM detection system.

FIG. 3 is a block diagram of one embodiment of a wireless communication system 30 that is adapted to determine the presence and location of PIM generated when radio downlink signals in different radio bands interact with a PIM source 18 (not shown in FIG. 3). The system 30 includes a base station 32 which can have a plurality of radios such as the radio 21. The base station 32 has a wideband antenna 22 and a PIM detection system 24 that includes a wideband receiver 26 and a PIM detector 28. The base station 32 also includes at least one radio 21 for transmitting and receiving the communication uplink and downlink signals that carry information relevant to communications between users of the wireless communication system 30. The radio 21 has a transmitter 34 with a transmitter path 36, a transmitter observation receiver (TOR) 37 and a receiver 38.

Downlink signals are transmitted via a duplexer 40 to the main antenna 13 for transmission to wireless devices 14 (not shown in FIG. 3). Signals from the wireless devices 14 are received by the antenna 13 and sent to the uplink receiver 38 via the duplexer 40. Data to be transmitted by the transmitter 34 on the downlink are received from the remote site 42 which is part of the network 16 (not shown in FIG. 3). Data received on the uplink by the receiver 38 may be sent to the remote site 42. Note that the uplink signals received by the receiver 38 may be transmitted to the PIM detector 28 to enable the PIM detector 28 to assess whether the uplink receiver suffers from PIM interferences. Note also, that the output of the TOR receiver 37, which is an indication of a downlink signal transmitted by the transmitter 34 may also be coupled to the PIM detector 28.

The wideband antenna 23 has a bandwidth wide enough to detect signals over a broad frequency spectrum to capture downlink signals from radios at the cell site 32 and to capture PIM signals, if any. The PIM detection system has a wideband receiver 26 that may be scanned over a wide frequency band to detect downlink signals and PIM signals. The signals from the wideband receiver 26 are input to the PIM detector 28. The PIM detector 28 samples the incoming signal from the wideband receiver 26 and compares the samples to a threshold to determine the frequencies of downlink signals. The PIM frequencies can be predicted from the frequencies of the downlink signals. This information can be transmitted from the PIM detector 29 to the remote site 42. Further, the signal from the wideband receiver 26 can be sampled at the PIM frequencies and compared to a threshold to determine whether PIM is present at each PIM frequency.

Note that in FIG. 3, the PIM detection system 24 is shown separate from the radio 21 but could be incorporated or integrated in whole or in part into the radio 21. Further, if the main antenna 13 supports a bandwidth wide enough to receive signals over the wide band scanned by the wideband receiver 26, then the main antenna 13 can be also used as a wideband antenna to receive downlink signals and PIM signals. In such case, the output of the main antenna 13 can be not only coupled to the duplexer 40, but also coupled directly to the wideband receiver 26 without an interposition of narrowband filters or other frequency limiting components.

Figure 4:
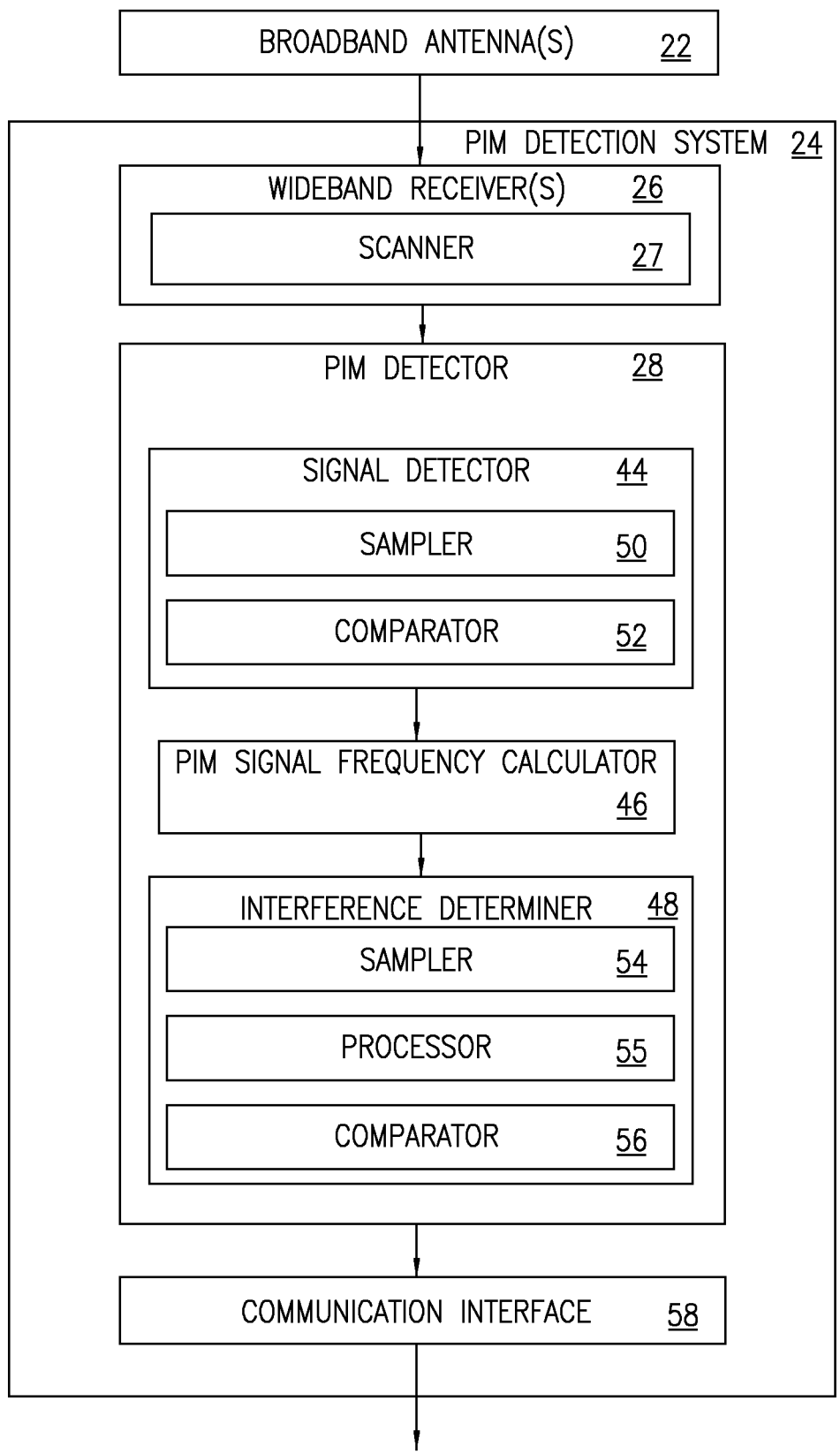
FIG. 4 is a block diagram of a PIM detection system constructed in accordance with principles described herein.

FIG. 4 is a detailed block diagram of the PIM detection system. The broadband antenna(s) 23 or main antenna 13 receive downlink signals and PIM signals generated at the cell site 30. The signals captured by the broadband antenna(s) 23 are directed to the PIM detection system 24. The PIM detection system 24 includes the wideband RF receiver(s) 26. The wideband receiver(s) 26 have a scanner 27 configured to cause the wideband receiver(s) 26 to scan over a wide frequency band to detect downlink signals and PIM signals. The signal output(s) from the wideband receiver(s) 26 are directed to the PIM detector 28. The PIM detector 28 includes a signal detector 44 that samples the received signal via a sampler 50 and compares the samples to a threshold via a comparator 52 in order to detect DL signals and their respective frequencies. When a sample of the received signal exceeds the threshold, a determination is made that the frequency at which the received signal is received is a downlink frequency. Note that the PIM detector may be implemented as dedicated integrated circuitry and/or a processor, such as a digital signal processor, and a memory containing computer instructions to configure the processor to perform the functions of the PIM detector 28.

Thus, the scanner 27 of the wideband receiver(s) 26 scans over the entire frequency band of the radio access technology of the base station 32 and the signal detector 44 detects the frequencies at which downlink signals are transmitted by radios at the cell site. Based on these detected frequencies, a PIM frequency calculator 46 calculates the frequencies at which PIM signals may occur. The calculated PIM frequencies are input to an interference determiner 48. The interference determiner 48 samples the received signal via the sampler 54. A processor 55 is configured to process the sample of the received RF signal and a sample of a signal at a calculated PIM frequency. For example, the processing may include correlating the sample of the signal at the calculated PIM frequency with the sample of the received radio frequency. A comparator 56 compares the output of the processing of processor 55 to a threshold to detect the presence of PIM. When the output exceeds the threshold, a determination is made that PIM is present at the calculated PIM frequency. The frequencies at which PIM is detected may be transmitted to a remote location via a communication interface 58.

Figure 5:
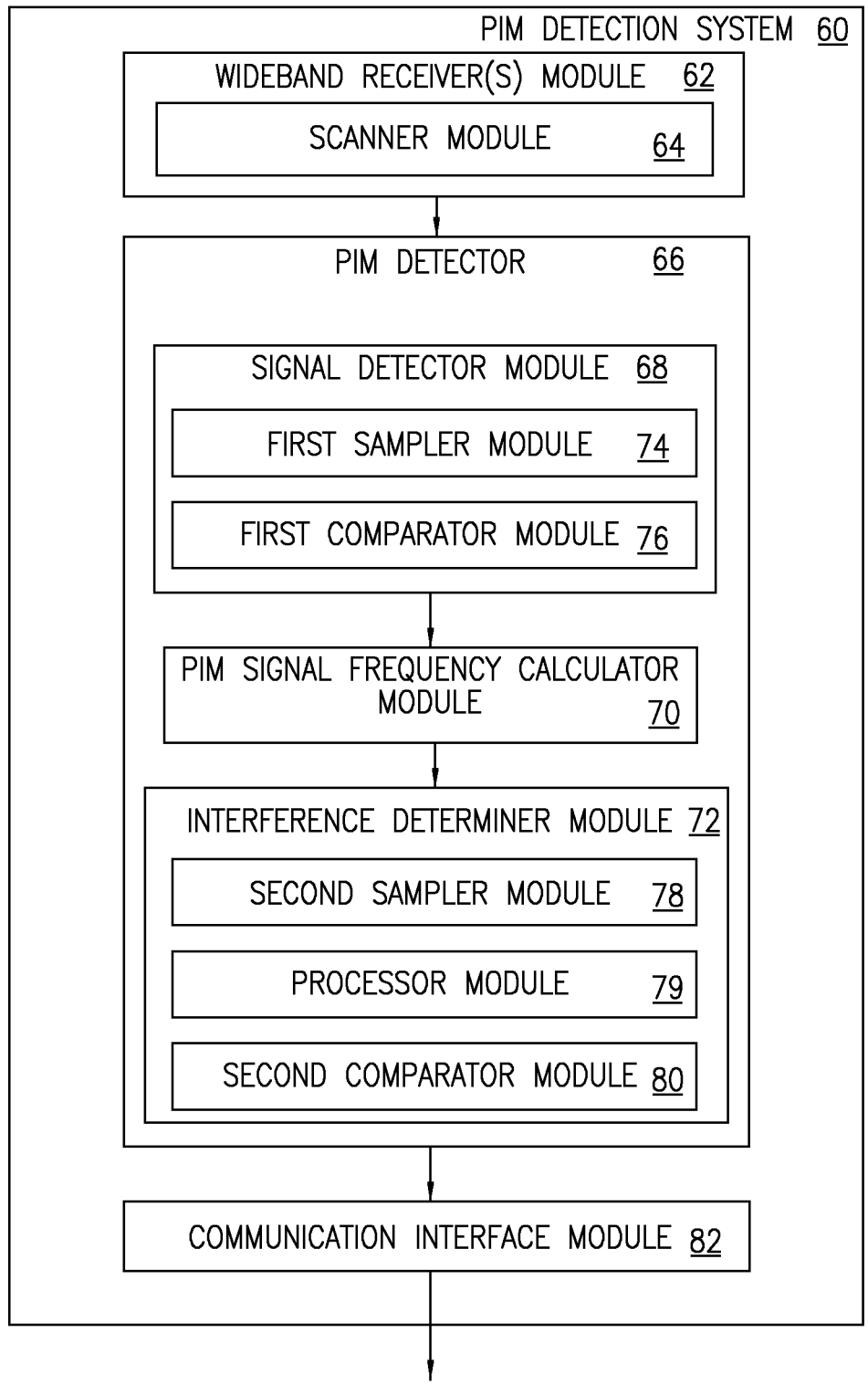
FIG. 5 is a block diagram of an alternative PIM detection system constructed in accordance with principles described herein.

FIG. 5 is a block diagram of an alternative embodiment of a PIM detection system 60 that may be implemented at least in part as software modules stored in a memory module 66. The software modules may have computer code that when executed by a processor, configure the processor to perform PIM detection functions as described herein. A wideband receiver module 62 and scanner module 64 may be implemented wholly in hardware or partially in hardware and partially in software. Thus, the signal detector module 68 contains instructions that when executed by a processor, configure the processor to sample the received signal according to instructions of a first sampler module 74, and compare the samples to a threshold according to instructions of a first comparator module 76, in order to detect the frequencies of downlink signals received by the wideband receiver module 62. Based on these frequencies, the processor is configured to calculate PIM signal frequencies according to instructions of a PIM signal frequency calculator module 70. An interference determiner module 72 includes a second sampler module 78 that contains instructions to configure a processor to sample the signal received by the wideband receiver module 62 at the calculated PIM frequencies. A processor module 79 includes instructions to configure a processor to process the sample of the received RF signal and a sample of a signal at a calculated PIM frequency. For example, the processor module 79 may include instructions to correlate the sample of the signal at the calculated PIM frequency with the sample of the received radio frequency. A second comparator module 80 includes instructions to configure a processor to compare a processing result to a threshold. If the processing result exceeds the threshold, PIM is deemed to be present at that frequency. The frequencies at which PIM is detected may be transmitted to a remote location via a communication interface 82.

Figure 6:
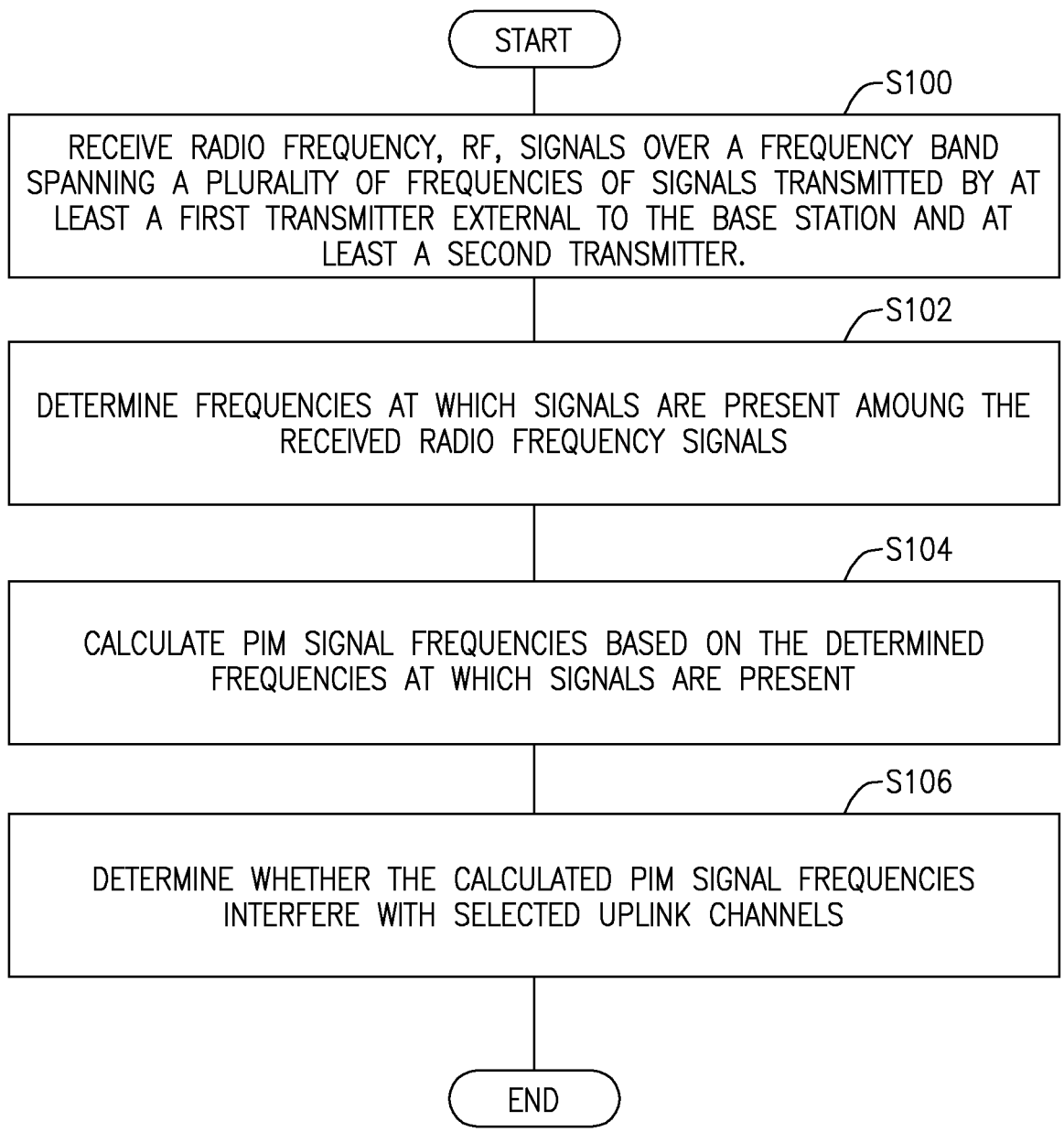
FIG. 6 is a flowchart of an exemplary process for determining PIM frequencies and determining the presence of PIM

FIG. 6 is a flowchart of an exemplary process for detecting PIM at a wireless communication base station 32. The process includes receiving RF signals via a wideband receiver 26 over a frequency band spanning a plurality of frequencies of signals transmitted by at least a first transmitter external to the base station and at least a second transmitter (block S100). The second transmitter may also be at the base station 32 or external to the base station. Frequencies at which signals are present among the received radio frequency signals are determined by a signal detector 44 (block S102). Some of these frequencies may be known beforehand. PIM signal frequencies are calculated based on the determined frequencies at which signals are present by a PIM signal frequency calculator 46 (block S104). The process also includes determining whether the PIM signals at the calculated PIM signal frequencies interfere with selected uplink channels (block S106).

Thus, some embodiments detect the presence of PIM arising from the mixing of downlink signals from a plurality of radio bands which may be widely separated. The methods described herein for PIM detection are independent of the specific radio access technologies that originate the downlink frequencies. The receivers used to detect PIM do not require high dynamic range since they do not demodulate the received signals, and can therefore be low cost, low complexity receivers.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that embodiments are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for detecting passive intermodulation, PIM, signals at a wireless communication base station, the method comprising:
receiving, by at least one interfering signal receiver of a PIM signal detection system, radio frequency, RF, signals over a frequency band spanning a plurality of frequencies of signals transmitted by at least a first transmitter external to the base station and at least a second transmitter, wherein the second transmitter has a transmitter observation receiver, TOR;
determining frequencies at which signals are present among the received radio frequency signals;
calculating PIM signal frequencies based on the determined frequencies at which signals are present; and
determining whether the calculated PIM signal frequencies interfere with selected uplink channels, and
utilizing the TOR of the second transmitter to sample a downlink signal of the second transmitter.

2. The method of claim 1, further comprising:
processing a sample of a signal at a calculated PIM frequency and a sample of the received radio frequency signals, wherein the processing includes correlating the sample of the signal at the calculated PIM frequency with the sample of the received radio frequency signals; and
comparing an output from the processing to a threshold to determine whether a PIM signal is present.

3. The method of claim 1, further comprising identifying frequencies of at least two RF signals contributing to PIM at a calculated PIM frequency.

4. The method of claim 1, wherein the receiving over the frequency band is performed by a single wide band receiver.

5. The method of claim 1, wherein the receiving includes receiving by a plurality of antennas having different polarizations.

6. The method of claim 1, wherein the receiving includes receiving by at least one wide band antenna.

7. The method of claim 1, further comprising periodically reporting results of PIM signal detection to a remote site.

8. The method of claim 1, wherein the receiving further comprises scanning over a frequency range to search for PIM signals.

9. The method of claim 1, wherein the received RF signals are adaptively weighted to isolate multiple RF signals having a same frequency.

10. A passive intermodulation, PIM, signal detection system for detecting PIM signals at a wireless communication base station, the PIM signal detection system comprising:
at least one interfering signal receiver collectively having a frequency response configured to:
receive radio frequency, RF, signals over a frequency band spanning a plurality of frequencies of signals transmitted by at least a first transmitter external to the base station and at least a second transmitter;
a signal detector circuitry configured to determine frequencies at which signals are present among the received RF signals;
a calculator circuitry configured to calculate PIM signal frequencies based on the determined frequencies at which signals are present; and
an interference determiner circuitry configured to determine whether the calculated PIM signal frequencies interfere with selected uplink channels;
wherein the second transmitter has a transmitter observation receiver, TOR, and the at least one interfering signal receiver utilizes the TOR of the second transmitter to sample a downlink signal of the second transmitter.

11. The PIM signal detection system of claim 10, wherein the interference determiner circuitry further includes a sampler configured to sample the received RF signals at a calculated PIM frequency;
a processor configured to process the sample of the received RF signals and a sample of a signal at a calculated PIM frequency, wherein the processing includes correlating the sample of the signal at the calculated PIM frequency with the sample of the received radio frequency signals; and
a comparator circuitry configured to compare an output of the processing to a threshold to determine whether a PIM signal is present.

12. The PIM signal detection system of claim 10, wherein the calculator circuitry is further configured to calculate PIM frequencies by identifying frequencies of two or more received RF signals contributing to a PIM signal.

13. The PIM signal detection system of claim 10, wherein the at least one interfering signal receiver is a single wide band receiver.

14. The PIM signal detection system of claim 10, further comprising a plurality of antennas coupled to at least one interference signal receiver ll2611, each antenna having a different polarization.

15. The PIM signal detection system of claim 10, further comprising at least one wide band antenna to receive the RF signals.

16. The PIM signal detection system of claim 10, further comprising a communication interface configured to periodically report results of PIM signal detection to a remote site.

17. The PIM signal detection system of claim 10, further comprising a scanner configured to scan over a frequency range to search for PIM signals.

18. The PIM signal detection system of claim 10, further including a duplexer, and wherein the at least one interfering signal receiver shares the duplexer with the second transmitter.

19. A passive intermodulation, PIM, signal detection system for detecting PIM signals at a wireless communication base station, the PIM signal detection system comprising:
at least one receiver circuitry collectively having a frequency response capable of receiving a plurality of radio frequency, RF, signals transmitted by transmitters of the base station;
a signal detector circuitry configured to determine frequencies at which signals are present among the received RF signals;
a calculator circuitry configured to calculate PIM signal frequencies based on the determined frequencies at which signals are present;
a sampling circuitry configured to sample the received RF signals at the calculated PIM signal frequencies to determine a presence of a PIM signal at each PIM signal frequency; and
an interference determiner circuitry configured to determine whether the calculated PIM signal frequencies interfere with selected uplink channels,
wherein at least one of the transmitters among the transmitters of the base station has a transmitter observation receiver, TOR, and the at least one receiver circuitry utilizes the TOR of the at least one of the transmitters to sample a downlink signal of a second transmitter.

20. The PIM signal detection system of claim 19, wherein the interference determiner circuitry is further configured to process a sample of a signal at a calculated PIM frequency and a sample of the received radio frequency signals, wherein the processing includes correlating the sample of the signal at the calculated PIM frequency with the sample of the received radio frequency signals; and wherein the PIM signal detection system further includes a comparator circuitry configured to compare a result of the processing to a threshold to detect whether a PIM signal is present.

21. The PIM signal detection system of claim 19, further comprising a communication interface circuitry configured to periodically report results of the passive intermodulation, PIM, detection to a site remote from a cell site.

22. The PIM signal detection system of claim 19, further comprising a scanner circuitry configured to scan over a frequency range to search for downlink signals.

\* \* \* \* \*